United States Patent [19]
Ash

[11] 3,754,948

[45] Aug. 28, 1973

[54] REFRACTORY COMPOSITIONS

[75] Inventor: Malcolm Donald Ash, Wirral, England

[73] Assignee: Morganite Ceramic Fibres Limited, Wirral, England

[22] Filed: Aug. 19, 1970

[21] Appl. No.: 65,086

[30] Foreign Application Priority Data
Aug. 21, 1969  Great Britain.................. 41,811/69

[52] U.S. Cl..................................... 106/55, 106/65
[51] Int. Cl............................................ C04b 35/16
[58] Field of Search .................. 106/99, 64, 40, 55; 252/62

[56] References Cited
UNITED STATES PATENTS

| | | | |
|---|---|---|---|
| 3,014,872 | 12/1961 | Scott | 252/62 |
| 3,249,568 | 5/1966 | Reis | 252/62 |
| 3,294,562 | 12/1966 | Caprio | 106/64 |
| 3,510,394 | 5/1970 | Cadotte | 106/40 R |

*Primary Examiner*—James E. Poer
*Attorney*—Plumley and Tyner

[57] ABSTRACT

Refractory insulating compositions which comprise mineral wool and ceramic fibre in admixture. Up to 60 percent by weight of the composition preferably can be mineral wool for low temperature applications; at higher temperatures a higher proportion of ceramic fibre is needed. The compositions may be mixed with carriers, binders and/or stiffeners.

3 Claims, 3 Drawing Figures

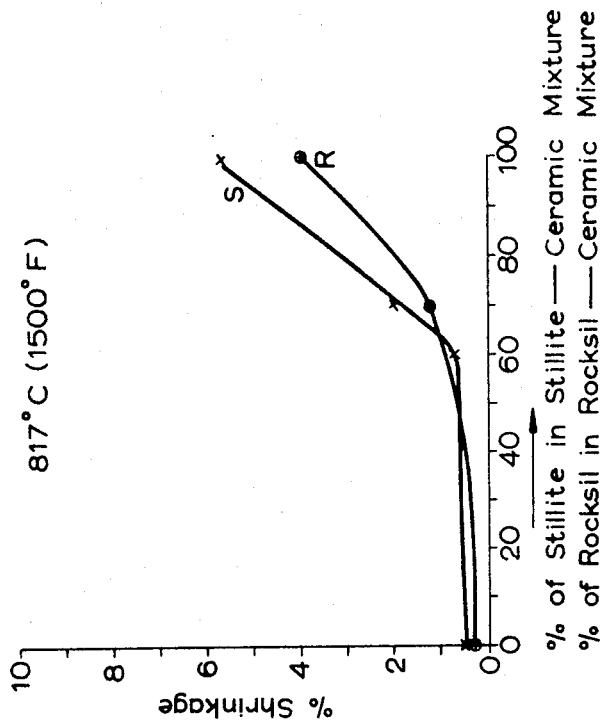
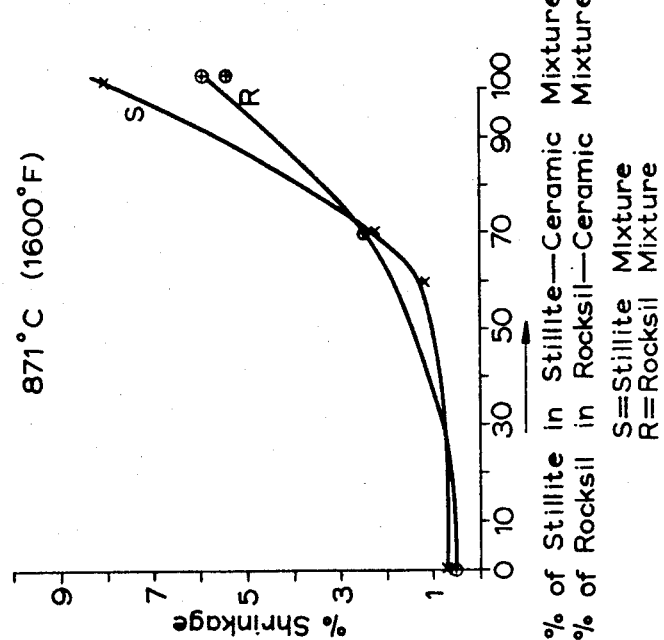

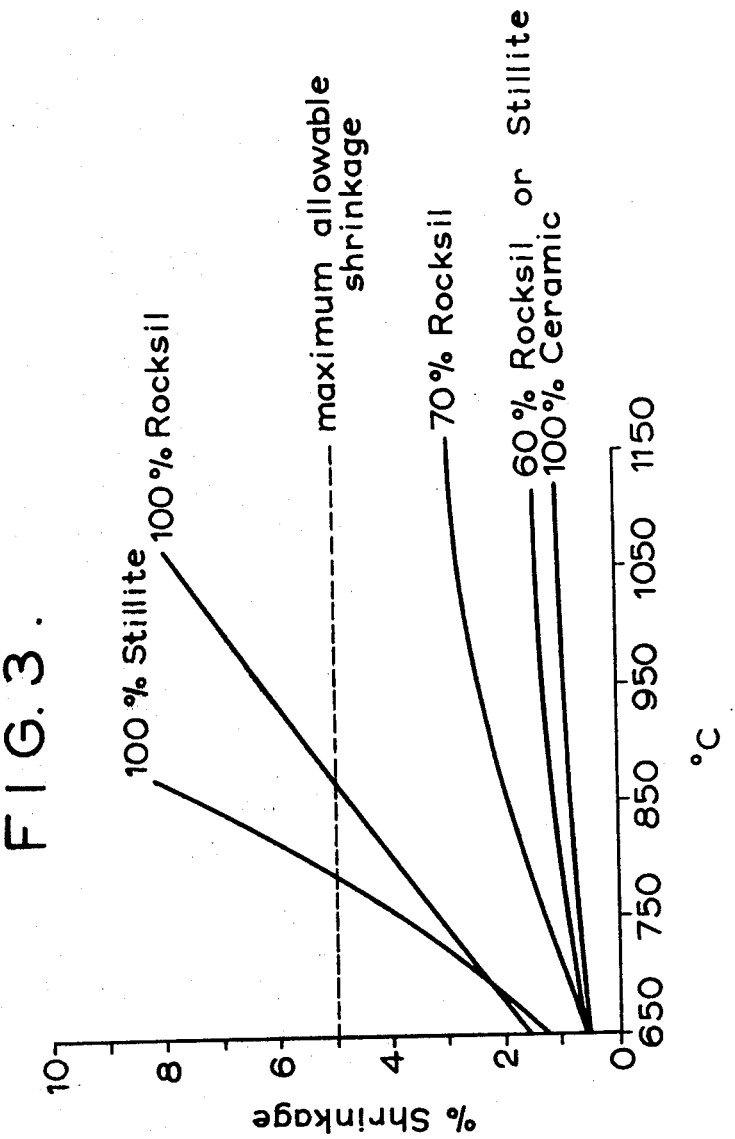

REFRACTORY COMPOSITIONS

This invention relates to refractory insulating compositions and in particular to compositions which comprise mineral wools.

A disadvantage of many refractory compositions is that they shrink when heated, the shrinkage increasing as the temperature increases. For some purposes shrinkage does not matter but often it is of cardinal importance. Thus a refractory fibrous layer which is in contact with a hot surface will tend to curl if the temperature of the surface exceeds a certain value. This undesirable curling of the refractory layer is caused by the fibres nearest the hot surface shrinking more than the fibres further away from the heat. Thus the maximum temperature at which a particular refractory fibre material can conveniently be used is usually dictated by the shrinkage. For general purposes we regard a shrinkage of 5 percent as being the maximum tolerable, although for some applications a figure of 3 percent is used.

Mineral wools, which are man-made fibres produced from molten minerals, have been used in place of asbestos, as they are serviceable at higher temperatures and do not involve the toxic hazard associated with asbestos.

The term mineral wool, as used herein, includes slag wool and rock wool. Mineral wools can, for example, be produced by passing a stream of molten rock or slag in front of high pressure steam or air jets. Slag, which can be formed into such wools, is obtained as a by product from various metallurgical processes and the composition of the slag will depend on the particular process from which it has been obtained.

Rock wools are made from molten rocks or minerals, e.g., limestone, which may contain other rocks, e.g., shales. Clearly the precise constitution of a rock wool will depend on the starting mineral or rock. Wollastonite has been used; as has basalt, which is a dark coloured igneous rock which comprises plagioclase, feldspar and augite. Other rocks have been used and these typically contain silica, alumina, lime, magnesia and iron oxide.

Irrespective of origin, the main chemical constituents of mineral wools in percentages by weight are usually from 25 to 50% $SiO_2$, 3 to 20% $Al_2O_3$, 20 to 45% CaO and 3 to 18% MgO.

Mineral wools can be used at higher temperatures than asbestos, in a range of about 500° C. to 850° C.. Above 850° C. the shrinkage is above 5 percent for most mineral wools and is, therefore, unacceptable.

If the working temperatures are greater than 850° C. it is usually necessary to use ceramic fibres instead which can be used in the temperature range of 800° to 1,250° C..

Ceramic fibres are usually made from fused natural minerals such as kaolins, bauxite, kyanite and certain fireclays or from mixtures of alumina and silica and modifying agents. They can also be made from viscous solutions. It seems that these fibres owe their highly refractory nature to a relatively high alumina content. Thus a typical mineral wool as defined above, contains 3 to 20% alumina, whereas ceramic fibres usually contain not less than 40% alumina. Ceramic fibres can be produced having very reproducible properties as they are made from relatively pure starting materials. Ceramic fibres are, however, very much more expensive than mineral wools.

Thus when working in a temperature range of 850° to 1,250° C. it has previously been necessary to use expensive ceramic fibres refractory compositions.

It is an object of this invention to increase the maximum temperatures at which mineral wools can be used, without the shrinkage becoming unacceptably large.

We have now found that it is possible to use mineral wools at substantially higher temperatures consistent with acceptable shrinkage if a proportion of ceramic fibres are admixed with the mineral wool.

We have further found surprisingly that the result of adding ceramic fibres to mineral wool reduces the shrinkage tendency of the ceramic fibre/mineral wool mixture to a greater extent than would be expected.

Accordingly the invention provides a refractory insulating composition which comprises an admixture of mineral wool and ceramic fibre. The invention also provides articles which have been made from these compositions.

Another aspect of the invention is the provision of refractory compositions which at a given working temperature exhibit a lower shrinkage than a pure mineral wool.

The compositions may contain additional materials, e.g., carriers, stiffeners and/or binders which may be in fibrous, powder or granular form. Examples of such additional materials are cements, raw or calcined clays and alumina.

Although in a composition it is the individual fibres which shrink, when they are bonded into a composition material the whole article will shrink. One would, therefore, expect that a composition of mineral wool and ceramic fibre would have a shrinkage which depended on the relative proportions of these two ingredients. For example at a given temperature, e.g., 1,000° C., a particular mineral wool might have a large (and practically quite unacceptable) shrinkage of 10 percent whereas the shrinkage of ceramic fibre is only 1 percent. One might therefore reasonably expect that the shrinkage of a composition containing 10 percent ceramic fibre and 90 percent mineral wool should have 10 percent of the properties of the ceramic fibre and 90 percent of the properties of the mineral wool. This would lead one to expect an overall shrinkage of 9.1 percent. Conversely if 10 percent of the mixture were mineral wool one would expect a shrinkage of about 1.9 percent. However, this is not found to be the case, as the presence of relatively small quantities of ceramic fibre in mineral wool compositions disproportionately reduces the overall shrinkage tendency and hence extends the maximum temperature at which mineral wool compositions can be used.

Thus we have found that up to 60 percent of the composition can be mineral wool without the shrinkage properties of the ceramic fibres composition being seriously affected. This also means, of course, that the addition of the mineral wool does not reduce significantly the maximum temperature at which the ceramic fibre compositions can be used.

This is illustrated in the accompanying drawings in which FIGS. 1 and 2 show the shrinkage curves for mineral wool/ceramic fibre compositions at two different temperatures. Each graph shows two different compositions using different commercially available mineral wools, Rocksil and Stillite, which are described more fully below. It can be seen from FIG. 1 that at 871° C. the shrinkage of the pure ceramic fibre is about 0.8 percent whereas, the shrinkage of pure Stillite is about 8 percent. It can be seen from the curve that the presence of only 30 percent of ceramic fibres reduces the shrinkage to almost 2 percent. FIG. 2 shows a very similar pattern at a lower temperature (817° C.).

Although at 817° C. pure Rocksil has an acceptable shrinkage, FIG. 2 illustrates the possibility of reducing the shrinkage further by the addition of relatively small amounts of ceramic fibre.

FIG. 3 shows the variation of the percentage shrinking of various ceramic fibre/mineral wool compositions at different temperatures. As the figure of 5 percent shrinkage is taken as the maximum allowable it will be seen that pure Stillite cannot be used above 800° C. and pure Rocksil above 850° C., whereas the addition of only 30 percent of ceramic fibre leads to a very acceptable shrinkage at temperatures as high as 1,150° C..

The measurement of the shrinkages given in the graphs are determined by making small bricks which are made predominantly of the mineral fibre together with an organic or, for example, a cement binder. The brick is measured and then heated to a given temperature and maintained at that temperature until maximum shrinkage has occurred and is then cooled again. The size of the brick before heat treatment and after heat treatment at room temperature are compared. Thus percentage linear shrinkage can then be easily calculated.

Clearly the amount of ceramic fibre added to a mineral wool composition will depend on the particular application for which it is intended and in particular on the maximum tolerable shrinkage and on the maximum temperature at which the refractory composition is likely to be used. The amount of ceramic fibre which is added will also depend on cost considerations. At the present time the cost of ceramic fibres is approximately six to 12 times the costs of mineral wool and hence it is usually desirable to use as small a proportion as possible of the ceramic fibre. Usually it is not necessary to use more than 50 percent by weight of the ceramic fibre and we have found that compositions containing 10 – 30 percent by weight of ceramic fibre are satisfactory for many applications.

It will be seen that one advantage of the invention is that it is now possible to use mineral wools at much higher operating temperatures without the drawback of an unacceptably high shrinkage. Another advantage of the invention is that it makes it possible to produce cheaper ceramic fibre compositions because the addition of relatively large amounts of the cheaper mineral wool do not impair the properties of the compositions too greatly.

The refractory compositions according to the invention can be prepared by mixing the ceramic fibres with the mineral wools. For some applications it may be desirable to chop the fibre tufts before they are mixed. The refractory compositions can, for example, be used to prepare by air or water deposition or vacuum forming, fibrous articles such as blankets, felts, blocks, boards, special shapes, paper products; by dry or wet blending, castables, concretes and cements, ramming, tamping and mouldable materials by the use of clay or plastic forming machinery pressed and injection moulded articles; by the use of conventional textile machinery, textiles, ropes threads and cloths and other woven or unwoven textiles. The fibres may be used in the bulk form in which they are produced and processed into blankets or other desired shapes with no additional ingredients.

The following Examples gives representative mineral wool/ceramic fibre compositions according to the invention.

EXAMPLE 1

The following composition was prepared 69.5% by weight Mineral wool - Rocksil 29.5% by weight Ceramic fibre - Triton Kaowool 1% by weight Methofas P.M. 1500

The composition was thoroughly mixed and was then mixed with water and formed into blocks and boards. The products were found to be useful at temperatures up to 1150° C. and had a shrinkage of less than 3% at this temperature. The shrinkage curve of bricks made from this composition is shown in FIG. 3 (designated 70% Rocksil).

EXAMPLE 2

The following composition was prepared 59.5% by weight Mineral wool - Stillite 39.5% by weight Ceramic fibre - Triton Kaowool 1% by weight Methofas P.M. 1500

The composition was prepared and used in the same way as in Example 1. Products made from this composition had an even smaller shrinkage (see FIG. 3; curve designated 60% Rocksill or Stillite).

EXAMPLE 3

The following composition was prepared 25% by weight Mineral wool - Stillite 10% by weight Ceramic fibre - Triton Kaowool 30% by weight colloidal silica Syton 30X 5% by weight micronised alumina MA 130 30% by weight water The composition was thoroughly mixed and then formed into blocks and boards which were allowed to set. The products were found to be useful at temperatures of up to 1150° C., having a shrinkage below 5%.

Rocksil is a rock wool which is manufactured and sold by the Cape Asbestos Co.. It is thought to be produced from a dolomite type of limestone and a siliceous fireclay.

Stillite is a slag wool and is produced by Stillite Products Ltd..

The ceramic fibre used was Triton Kaowool which is available from Morganite Ceramic Fibres Ltd., and which is produced from kaolin, a naturally occurring alumina silicate fireclay of high purity.

The Syton 30X colloidal silica is manufactured by Monsanto Chemicals Ltd., the micronised alumina by B.A. Chemicals Ltd., and the Methofas PM 1,500 which is a methyl hydroxypropyl cellulose manufactured by Imperial Chemical Industries Ltd..

What I claim is:

1. A refractory insulating composition consisting essentially of an admixture of mineral wool containing 3–20% alumina and ceramic fiber containing not less than 40% alumina said ceramic fiber comprising 10% to about 50% by weight based on the weight of ceramic fiber and mineral wool.

2. The composition of claim 1 comprising up to about 60% by weight of mineral wool.

3. The composition of claim 1 comprising about 10 to about 30% by weight of ceramic fibre.

* * * * *